US008070054B2

(12) United States Patent
Halbur et al.

(10) Patent No.: US 8,070,054 B2

(45) **Date of Patent: *Dec. 6, 2011**

(54) STORED-VALUE PRODUCT WITH MANUFACTURED ARTICLE

(75) Inventors: Ted C. Halbur, Lino Lakes, MN (US); Travis M. Robertson, St. Louis Park, MN (US); David B. Smith, Falcon Heights, MN (US); Erin M. Borkowski, Andover, MN (US); Primoz Samardzija, Marina del Ray, CA (US); Daniel Eke, Andover, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/900,877

(22) Filed: Oct. 8, 2010

(65) Prior Publication Data

US 2011/0021106 A1 Jan. 27, 2011

Related U.S. Application Data

(63) Continuation of application No. 11/437,462, filed on May 19, 2006, now Pat. No. 7,810,710.

(51) Int. Cl.
*G06F 17/00* (2006.01)

(52) U.S. Cl. ......................... 235/375; 235/380; 235/487

(58) Field of Classification Search .................. 235/379, 235/375, 380, 385, 487
See application file for complete search history.

(56) References Cited

U.S. PATENT DOCUMENTS

| | | | | |
|---|---|---|---|---|
| 1,547,176 | A | 7/1925 | Lazaron | |
| 3,624,938 | A | 12/1971 | Richard | |
| 4,597,743 | A | 7/1986 | Becker et al. | |
| 4,646,959 | A | 3/1987 | Sheffer | |
| 4,804,133 | A | 2/1989 | Kiyokane | |
| 4,921,094 | A | 5/1990 | van den Akken | |
| 4,958,455 | A | 9/1990 | Jacobsen | |
| 5,152,090 | A | 10/1992 | Jacobsen | |
| 5,310,109 | A | 5/1994 | Prime et al. | |
| D374,001 | S | 9/1996 | Vance | |
| 5,622,256 | A | 4/1997 | Tesar | |
| 5,669,165 | A | 9/1997 | Santorsola | |
| D386,399 | S | 11/1997 | Stokely et al. | |
| D408,456 | S | 4/1999 | Garner | |
| 5,959,281 | A | 9/1999 | Domiteaux | |
| 6,085,451 | A | 7/2000 | Riehle | |
| 6,152,298 | A | 11/2000 | Dods | |
| D437,309 | S | 2/2001 | Brennan | |
| D438,529 | S | 3/2001 | Brennan | |
| 6,568,532 | B1 | 5/2003 | Leach | |
| 6,598,800 | B1 | 7/2003 | Schmit et al. | |
| D497,142 | S | 10/2004 | Smith | |
| 6,832,730 | B2 | 12/2004 | Conner et al. | |
| 7,000,842 | B2 | 2/2006 | Yamaguchi et al. | |
| D547,396 | S | 7/2007 | Yaguchi | |
| 7,445,157 | B2 | 11/2008 | Clegg et al. | |
| 7,810,710 | B2 * | 10/2010 | Halbur et al. | 235/375 |
| 2002/0143697 | A1 | 10/2002 | Gotfried | |
| 2003/0014891 | A1 | 1/2003 | Nelms et al. | |

(Continued)

*Primary Examiner* — Karl D Frech
(74) *Attorney, Agent, or Firm* — Griffiths & Seaton PLLC

(57) ABSTRACT

A stored-value product includes a toy automobile and a panel. The toy automobile includes a body and wheels rotatably coupled to the body. The panel is coupled to the body and includes an account identifier signifying a financial account or record linked to the stored-value card assembly. Stored-value product assemblies, methods of promoting sales of stored-value products, methods of using a stored-value product and other embodiments are also disclosed.

19 Claims, 7 Drawing Sheets

U.S. PATENT DOCUMENTS

2003/0150149 A1 8/2003 Quick
2004/0182940 A1 9/2004 Biller
2006/0080539 A1 4/2006 Asami et al.
2006/0091149 A1 5/2006 Chen
2006/0124748 A1 6/2006 Osborn et al.
2006/0261170 A1 11/2006 Mooney et al.
2007/0143170 A1* 6/2007 Proch et al. .................... 705/10
2007/0194128 A1 8/2007 Coe et al.
2007/0215694 A1 9/2007 Clegg
2007/0261989 A1 11/2007 Stoles
2007/0267313 A1* 11/2007 McLean ........................ 206/457
2007/0277416 A1 12/2007 Fedan

* cited by examiner

STORED-VALUE PRODUCT WITH MANUFACTURED ARTICLE

CROSS-REFERENCE TO RELATED APPLICATION

This application is a continuation of and claims priority under 35 U.S.C. §120 to U.S. patent application Ser. No. 11/437,462, filed May 19, 2006, now U.S. Pat. No. 7,810,710, issued Oct. 12, 2010, which is incorporated herein in its entirety.

BACKGROUND OF THE INVENTION

Stored-value cards and other financial transaction cards come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the gift card declines as the card is used, thereby, encouraging repeat visits to the retailer or other provider issuing the card. Additionally, the card generally remains in the user's purse or wallet, serving as an advertisement or reminder to revisit the associated retailer. Stored-value cards provide a number of advantages to both the consumer and the retailer.

SUMMARY OF THE INVENTION

One aspect of the present invention relates to a stored-value product including a toy automobile and a panel. The toy automobile includes a body and wheels rotatably coupled to the body. The panel is coupled to the body and includes an account identifier signifying a financial account or record linked to the stored-value card product. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Gift cards, financial transaction cards, or other stored-value cards and associated assemblies are adapted for making purchases of goods and/or services at e.g. a retail store or website. The embodiments described herein relate to a stored-value product configured to function as a stored-value card in addition to providing a manufactured article to amuse or otherwise provide additional use to the consumer or recipient. According to one embodiment, an original consumer buys a stored-value product to give a recipient who in turn is able to use at least a portion of the stored-value product at the retail store or other setting to pay for goods and/or services.

In one example, the stored-value product includes a three-dimensional, manufactured article such as a toy, game, book, novelty item, memorabilia, utensil, beauty product, accessory, or other article coupled with a carrier, which supports the article during display, shipping, and delivery. The stored-value product includes an account identifier, which links the stored-value product and facilitates access to an associated financial account or record for loading to, debiting from, and activating the stored-value product. Since the account identifier and the article are both included as part of the stored-value product, the stored-value product not only serves as tender for the purchase of goods and/or services, but also entertains or provides additional use to bearers of the article. In one embodiment, the presentation of the stored-value product promotes the sale and/or loading of the stored-value product by potential consumers and/or other bearers of the stored-value product.

Figure 1:
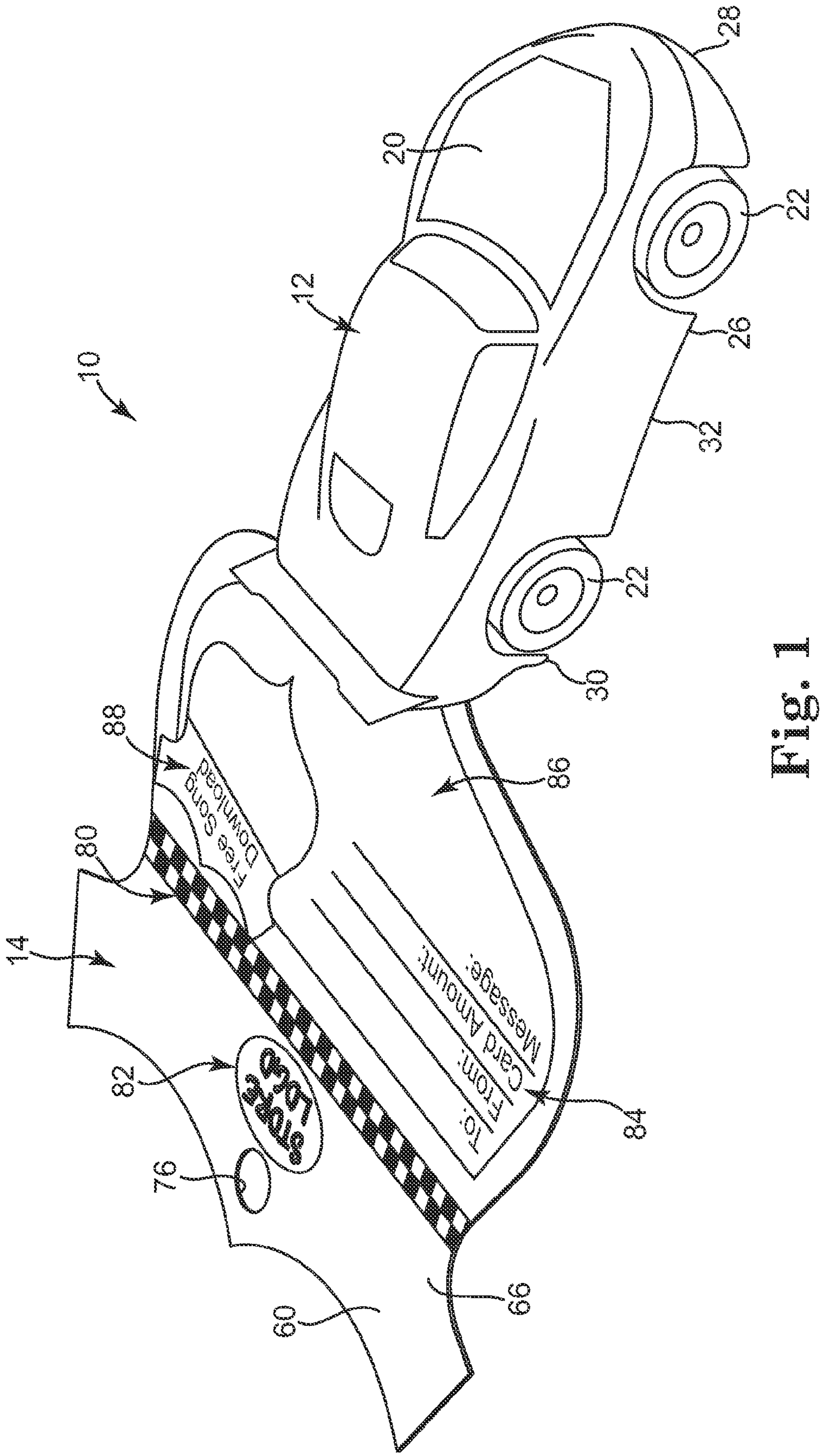
FIG. 1 is a top perspective view illustration of one embodiment of a stored-value product, according to the present invention.
Figure 2A:
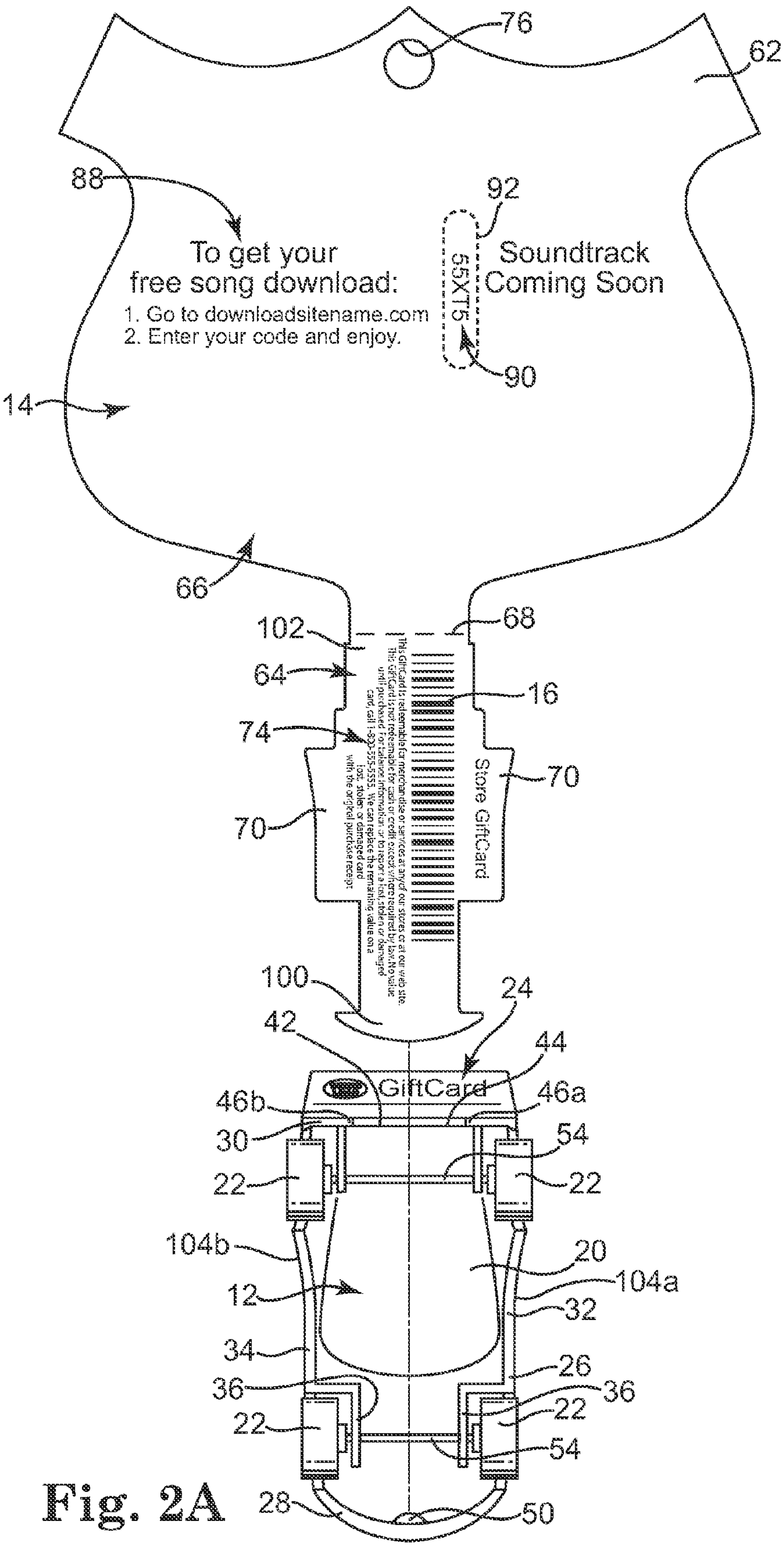
FIG. 2A is a bottom, exploded view illustration of one embodiment of the stored-value product of FIG. 1, according to the present invention.
Figure 2B:
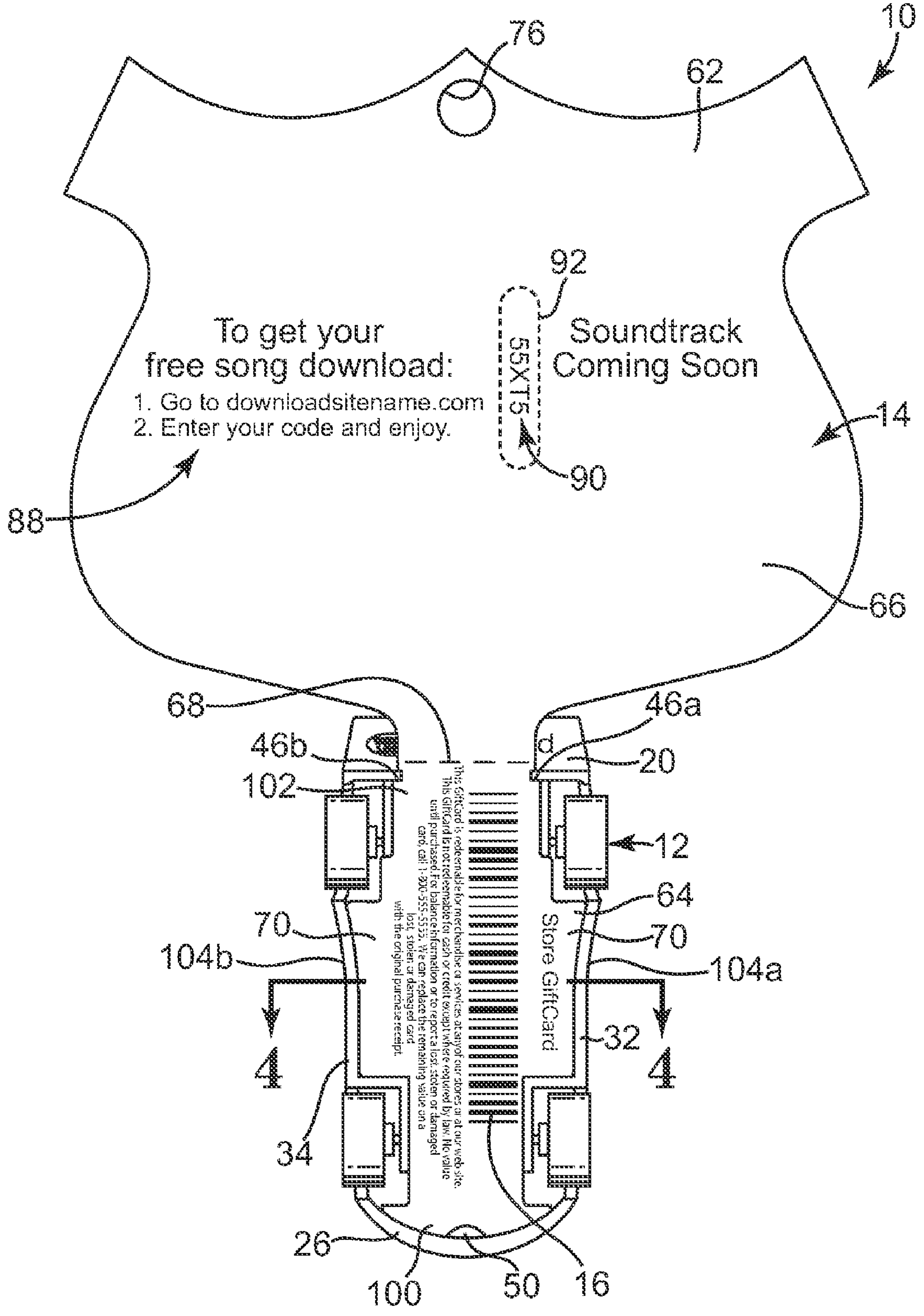
FIG. 2B is a bottom view illustration of the stored-value product of FIG. 2A.

Turning to the figures, FIGS. 1, 2A, and 2B illustrate one embodiment of a stored-value product or financial transaction system 10 according to the present invention. For clarity, stored-value product 10 is primarily described and illustrated herein as including a toy automobile, for example, a toy car 12. However, it should be understood that any other small article of manufacture can be readily substituted for car 12. In addition to car 12, stored-value product 10 includes a backer or carrier 14 and an account identifier 16. Car 12 is coupled with the carrier 14 such that carrier 14 is configured to support car 12 during display, storage, etc. Account identifier 16 is included on at least one of car 12 and carrier 14 and links stored-value product 10 to a financial transaction account or record and provides a means for accessing the financial account to access monetary funds associated therewith for paying for goods and/or services.

In one example, car 12 corresponds with a promotion for a sales item, a movie, a book, a television show, a sporting event, sports team, or any other suitable promotion. In one example illustrated in FIGS. 1-5 and as primarily described below, car 12 is a toy car. Car 12 includes a body 20 and wheels 22. Body 20 defines the general shape of car 12. In one embodiment, body 20 includes indicia 24 (FIGS. 2A and 3), which may include brand or store logo(s), identifying indicia, decorative indicia, demarcations, text, etc. Indicia 24 may be printed directly to or printed to intermediate members that are subsequently adhered or otherwise secured to body 20. In one embodiment, other indicia are additionally or alternatively included on body 20.

Referring to FIG. 2A, in one embodiment, body 20 defines a lower or bottom edge 26 along the lower portion thereof. In one embodiment, bottom edge 26 is discontinuous due to the positioning of wheels 22 relative to body 20. In one embodiment, bottom edge 26 is substantially continuous. The bottom edge 26 includes a front portion 28, a rear portion 30, a first side portion 32, and a second side portion 34. Rear portion 30 is spaced from and opposite front portion 28, and side portions 32 and 34 extend therebetween opposite one another. In one example, body 20 is substantially hollow. In such an embodiment, one or more internal supports 36 extend from internal portions of body 20 to form internal portions of bottom edge 26.

Figure 3:
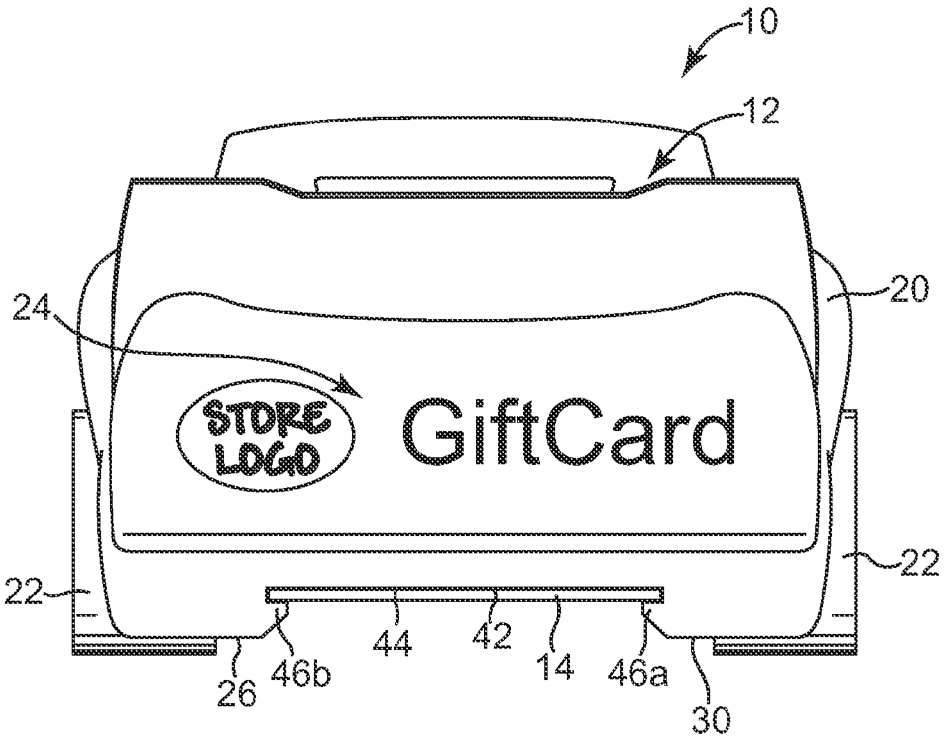
FIG. 3 is a rear view illustration of one embodiment of a toy and a portion of the carrier of the stored-value product of FIG. 1, according to the present invention.

Body 20 includes a plurality of tabs or flanges extending from or formed near bottom edge 26 to facilitate attachment to carrier 14. Referring to FIGS. 2A and 3, in one embodiment, a cutout or recess 42 is formed through rear portion 30 to form a bottom cutout edge 44 offset from the remainder of bottom edge 26. A pair of flanges 46*a* and 46*b* flank cutout 42. More particularly, first flange 46*a* extends from relatively near first side portion 32 toward second side portion 34, and second flange 46*b* extends from relatively near second side portion 34 toward first side portion 32. In one embodiment, first flange 46*a* is symmetrically positioned relative to second flange 46*b* about a longitudinal axis of car 12.

In one example, the plurality of flanges additionally or alternatively includes a third flange 50. Third flange 50 extends from front portion 28 of bottom edge 26 toward rear portion 30. In one embodiment, third flange 50 is substantially curvilinear or has a generally semi-circular shape. In one embodiment, other flanges are used in addition or as an alternative to flanges 46*a*, 46*b*, and/or 50.

Wheels 22 are coupled with and rotatable relative to body 20, such that car 12 can be used as a toy in which wheels 22 rotate as car 12 is moved across a surface (not shown) such as a table or floor. In one example, four wheels 22 are included wherein pairs of wheels including one wheel on each side of car 12 are coupled to one another with an axle 54 to facilitate even rotation of each wheel 22 in a pair. In one embodiment, axle 54 extends through a portion of body 20 near each wheel 22 in the corresponding pair thereby coupling each wheel 22 to body 20 via an axle 54.

In one embodiment, body 20 and wheels 22 are formed of a suitable plastic, a metal or metal alloy, or any other suitable material. In one example, body 20 and wheels 22 are each formed by injection molding polyvinyl chloride (PVC). In one embodiment, axle 54 is formed of a metal such as aluminum, etc. or other suitable material.

Referring to FIGS. 1 and 2A, carrier 14 comprises a single layer or multiple layers of paper or plastic material, for example, substantially in the form of a relatively stiff but bendable/flexible card. Use of other materials is also contemplated. In one embodiment, carrier 14 is a substantially planar substrate defining a first surface 60 (FIG. 1) and a second surface 62 (FIG. 2A) opposite first surface 60. Carrier 14 additionally defines a car portion 64 and a display portion 66. Car portion 64 is configured to interact with and be coupled to car 12, while display portion 66 extends therefrom. In one embodiment, a score line 68 (indicated by a dashed line in FIG. 2A) extends across carrier 14 between car portion 64 and display portion 66 to facilitate subsequent detachment of display portion 66 from car portion 64.

In one embodiment, car portion 64 is sized and shape to be substantially received within the confines of car bottom edge 26. In one example, upon assembly, car portion 64 is sized so as to be a solid bottom panel of car 12 (FIG. 2B) as will be further described below. Due to this configuration, car portion 64 includes protrusions and/or cutouts to facilitate positioning of car portion 64 relative to bottom edge 26. In particular, car portion 64 includes two protrusions 70 each laterally extending outward and configured to fit between the pairs of wheels 22 of car 12 to interact with first side portion 32 and second side portion 34 of bottom edge 26, respectively.

In one embodiment, second surface 62 of car portion 64 includes account identifier 16 such as a bar code, magnetic strip, smart chip or other electronic device, radio frequency identification (RFID) device, or other suitable device readily readable by a point-of-sale terminal, account access station, kiosk, or other suitable device. Account identifier 16 may be printed or otherwise disposed on second surface 62. Account identifier 16 indicates a financial account or record to which stored-value product 10 is linked. The account or record maintains the monetary balance on stored-value product 10 and is optionally stored on a database, other electronic or manual record-keeping system, or in the case of "smart" cards for example, on a chip or other electronic device on stored-value product 10 itself Accordingly, by scanning account identifier 16, a financial account or record linked to stored-value product 10 is identified and can subsequently be activated, have amounts debited therefrom, and/or having amounts added thereto. In view of the above, account identifier 16 is one example of means for linking stored-value product 10 with a financial account or record.

In one embodiment, redemption indicia 74 are included on second surface 62 of carrier 14. Redemption indicia 74 indicate that stored-value product 10 is redeemable for the purchase of goods and/or services, and that, upon use, a value of the purchase goods and/or services will be deducted from a financial account or record linked to stored-value product 10. In one embodiment, redemption indicia 74 include phrases such as "<NAME OF STORE>GiftCard" and "This GiftCard is redeemable for merchandise or services at any of our stores or at our website," and/or provides help or telephone information in a case of a lost, stolen, or damaged stored-value card, etc. In one embodiment, other indicia are printed or otherwise disposed on second surface 62 including other objects, text, backgrounds, graphics, brand identifiers, etc. In one embodiment, account identifier 16 and/or redemption indicia 74 are alternatively or additionally included on car 12 or another portion of carrier 14.

Display portion 66 of carrier 14 rearwardly extends from car portion 64. Display portion 66 is configured to provide promotional and other information regarding stored-value product 10. In one example, a support arm aperture 76 is defined within display portion 66 and is configured to receive a support arm or hook. As such, carrier 14 can be hung on the support arm or hook for display in a retail store. In one embodiment, display portion 66 is eliminated such that carrier 14 only includes car portion 64. Carrier 14 may additionally include any number of cutouts or be formed of any other suitable shape as desired to achieve a particular visual effect or to otherwise enhance the function of carrier 14.

In one embodiment, carrier 14 displays additional indicia, graphics or text information including store logo(s), store name(s), slogans, advertising, instructions, directions, brand indicia, promotional information, media format identifiers (e.g. characters, logos, scenes, or other illustrations relating to at least one of a movie, television show, book, etc.), characters, and/or other information. For example, first surface 60 includes indicia 80, 82, 84, and 88. However, indicia 80, 82, 84, and 88 may be included anywhere on carrier 14 or car 12. In one embodiment, additional or alternative indicia besides the indicia specifically described and illustrated herein are included on carrier 14.

Indicia 80 are decorative indicia that generally improve the aesthetic appeal of carrier 14. In one embodiment, decorative indicia 80 are positioned and configured to correspond with indicia 24 (FIG. 3) of stored-value product 10. In one embodiment, indicia 80 relate to a particular occasion, such as a wedding, new baby, graduation, holiday, season, brand identifier, media format identifier (i.e., identifier of a book, movie, television shown, etc.), birthday, or any other visual design to promote purchase of stored-value product 10. In one example, indicia 80 include a picture or graphic referring to a movie or book character and are configured to coordinate with the release of an associated movie or book release date or anniversary.

Indicia 82 identify a store, brand, department, media title or logo, e.g. a title or logo of a move, book television show, video game, etc. associated with stored-value product 10, etc. In one embodiment, indicia 80 and/or 82 are additionally or alternatively included on first surface 60 and/or second surface 62 of carrier 14.

Indicia 84 instruct or otherwise inform a bearer of stored-value product 10 to write items of interest in associated field(s) 86. In one embodiment, indicia 84 include the text "To," "From," "GiftCard Amount," and/or "Message" each being associated with a field 86 designated to be written on by user with a pen, pencil, marker, etc.

In one embodiment, download indicia 88 promote that stored-value product 10 is related to a file download and/or instruct a bearer of stored-value product 10 how to download the related file. For example, where stored-value product 10 relates to a movie, television show, or video game, the file may include a song or video clip from the movie, television show, or video game. In one embodiment, indicia 88 on second surface 62 instruct a user to download the file by visiting a website and using a code 90 also provided on carrier 14. Code 90 can be any arrangement of number or letters configured to provide bearer of stored-value product 10 with access to a file for download over the Internet. In one example, in order to prevent others from using code 90 to download a file before purchase of stored-value product or before the bearer of stored-value product can download the file, a scratch release material such as silver or gold UV scratch release material is provided over code 90 as generally indicated at 92 with a broken line in FIGS. 2A and 2B. In one example, different codes 90 are provided on different stored-value products and different files correspond with a different groups of one or more code 90.

Stored-value product 10 is assembled by coupling carrier 14 with car 12. In particular, referring to FIGS. 2A, 2B and 4, carrier 14 is positioned relative to car 12 to be at least partially supported by internal supports 36 and/or cutout edge 44 and received by two or more flanges 46*a*, 46*b*, and 50. As such, supports 36 generally prevent carrier 14 from falling into the hollow body 20 of car 12 and flanges 46*a*, 46*b*, and/or 50 maintain carrier 14 coupled to car 12. In particular, a front 100 of car portion 64 is positioned adjacent front portion 28 of bottom edge 26 of car 12 and is slid below third flange 50. In one example, as illustrated with additional reference to FIG. 3, car portion 64 is also positioned relative to car 12 such that opposite edges near a rear 102 of car portion 64 are received by each of first and second flanges 46*a* and 46*b*, respectively. More specifically, rear 102 of car portion 64 is maintained between cutout edge 44 and flanges 46*a* and 46*b*. As such, car portion 64 is coupled with car 12. In one embodiment, upon positioning and coupling, car portion 64 is a bottom panel of car 12.

Figure 4:
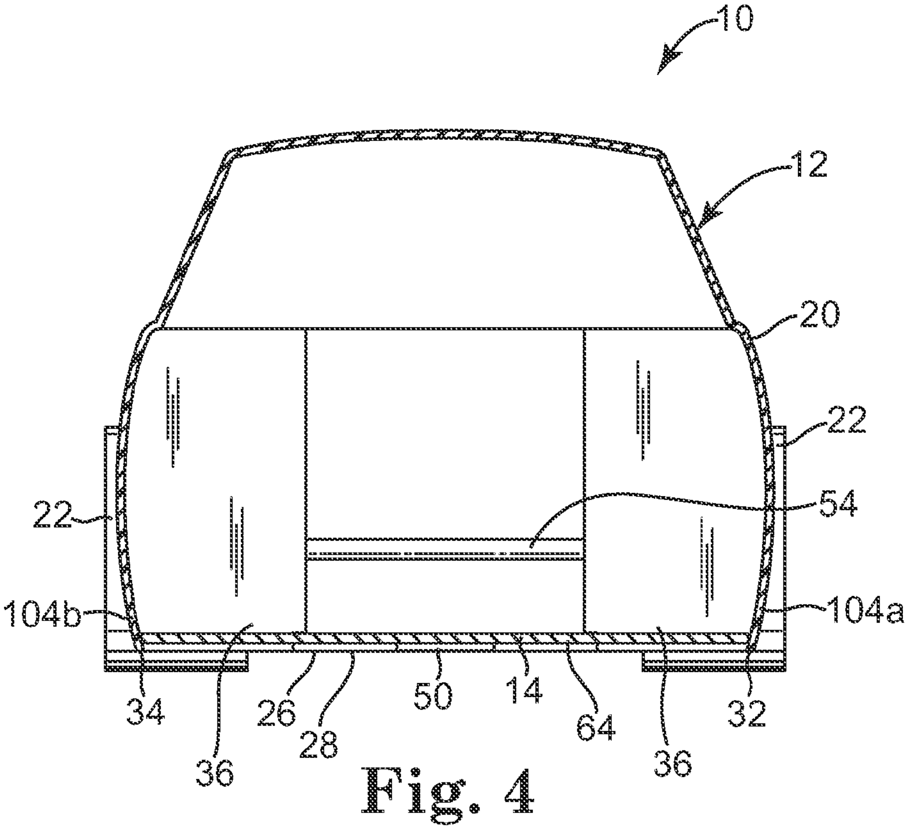
FIG. 4 is a cross-sectional view illustration of the stored-value product of FIG. 2B taken along the line 4-4.

Referring to FIG. 4, in one embodiment, car body 20 is formed such that opposite side walls 104*a* and 104*b* of car body 20 are curved toward one another near bottom edge 26. In this manner, side walls 104*a* and 104*b* of car body 20 contact car portion 64, more particularly, protrusions 70 (FIG. 2B) to further facilitate and strengthen the coupling and positioning of car portion 64 relative to car 12.

When car portion 64 of carrier 14 is coupled with car 12, display portion 66, if included, is thereby coupled to car 12 via car portion 64. Display portion 66 is removable from car portion 64 by breaking, cutting, snapping, etc. carrier 14 along score line 68. In one embodiment, car portion 64 functioning as the bottom panel of car 12 is integrally formed as a single piece with or is otherwise formed and attached to car 12.

Figure 5:
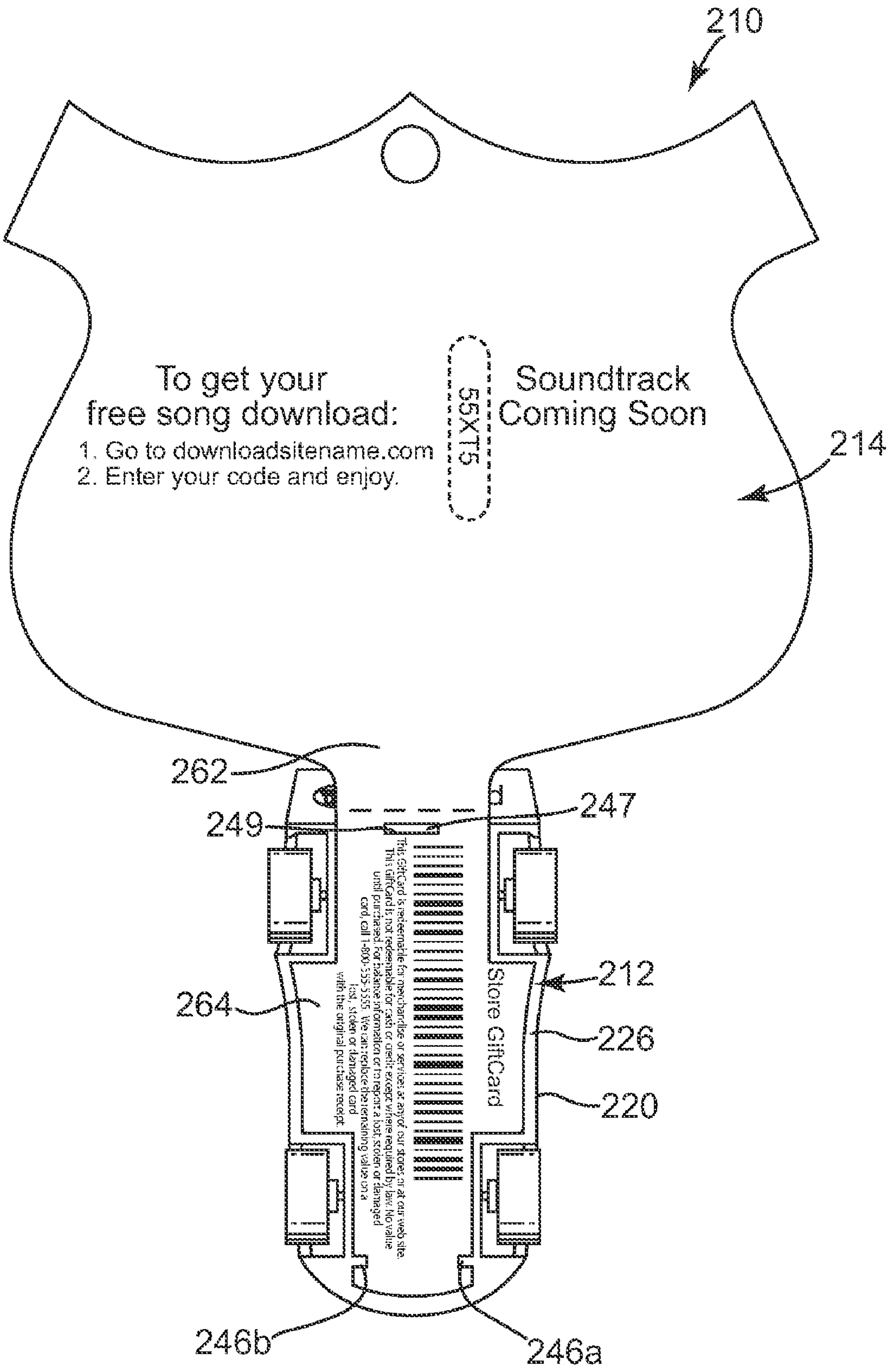
FIG. 5 is a bottom view illustration of one embodiment of a stored-value product, according to the present invention.

FIG. 5 illustrates another embodiment of a stored-value product at 210. Stored-value product 210 is similar to stored-value product 10 described above except where specifically described herein. Stored-value product 210 includes a toy 212 and a carrier 214 generally similar to car 12 and carrier 14. As such, toy 212 includes a body 220 defining a bottom edge 226. Body 220 defines a plurality of flanges including first and second flanges 246*a* and 246*b* similar to flanges 46*a* and 46*b* except for the positioning of flanges 246*a* and 246*b*. In particular, flanges 246*a* and 246*b* are included toward a front portion of body 20.

In one embodiment, a third flange or tab 247 extends downwardly from body 220 and is configured to receive an interior area of car portion 264 of carrier 214. More specifically, car portion 264 defines a connection aperture 249 therein configured to permit third flange 247 to pass therethrough to interact with a second side 262 of carrier 214, more particularly, with second side 262 of car portion 264 of carrier 214. As such, carrier 214 is coupled with toy 212. Other methods and means of coupling carrier 14 and 214 to toys 12 and 212, respectively, are also contemplated.

Figure 6:
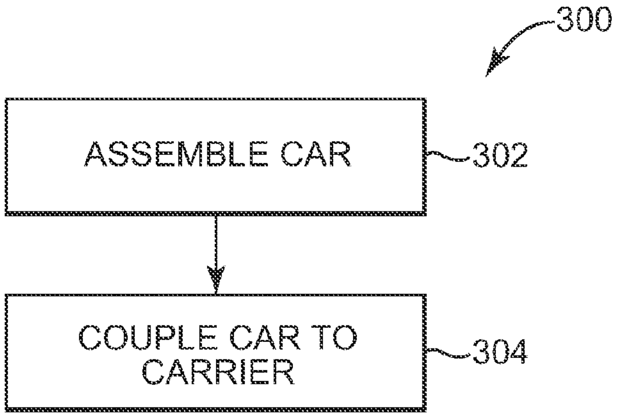
FIG. 6 is a flow chart illustrating one embodiment of a method of assembling a stored-value product, according to the present invention.

FIG. 6 is a flow chart illustrating one embodiment of a method 300 of assembling car 12 with carrier 14. Additionally referring to FIG. 1, at 302, wheels 22 are coupled to body 20 to assemble car 12. In one embodiment, assembly of car 12 may also include adding decals, indicia, accessories, and/or other suitable elements to body 20 and/or may include assembling body 20 itself dependent upon the overall design of car 12. At 304, the assembled car 12 is coupled with carrier 14 to collectively form stored-value product 10. More specifically, in one example, car portion 64 of carrier 14 is placed to be confined substantially within bottom edge 26 of car 12 and to interact with flanges 46*a*, 46*b*, and 50 thereby coupling car 12 to carrier 14 as described above.

Figure 7:
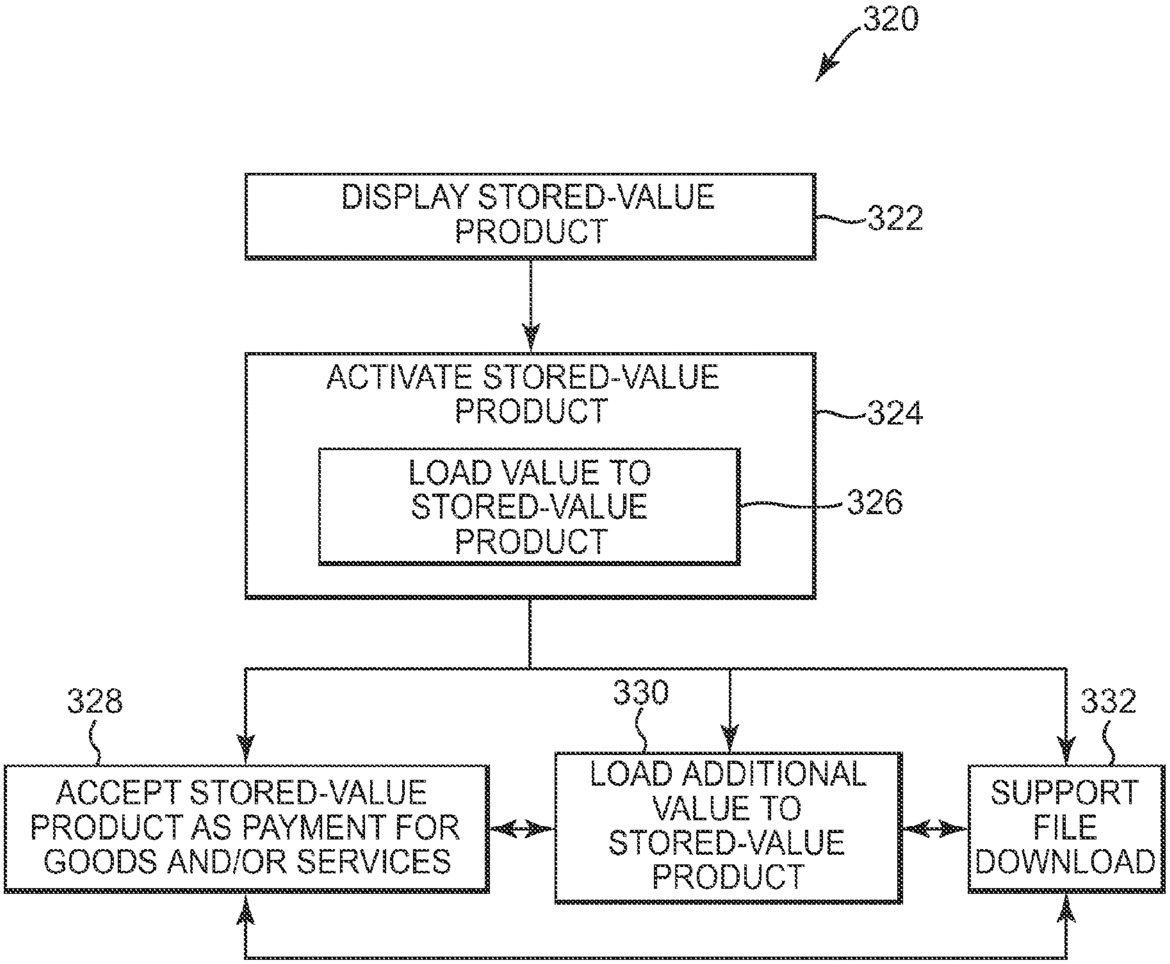
FIG. 7 is a flow chart illustrating one embodiment of a method of providing a stored-value product, according to the present invention.

FIG. 7 is a flow chart illustrating one embodiment of a method 320 of providing stored-value product 10 for sale to and use by consumers. At 322, stored-value product 10 is placed or hung from a rack, shelf, or similar device to display stored-value product 10 for sale to potential consumers. For example, stored-value product 10 is hung from a display rod via support arm aperture 76. In one example, stored-value product 10 is placed for sale such that car 12 is visible to potential consumers. In one embodiment, a depiction of stored-value product 10 is placed on a website for viewing and purchase by potential consumers.

At 324, a consumer, who has decided to purchase stored-value product 10, presents the stored-value product 10 to a retail store employee, retail store kiosk, or other person or device to scan account identifier 16 of stored-value product 10 to access the financial account or record linked to account identifier 16. As such, account identifier 16 is in an easily accessible position on carrier 14. Notably, at least wherein account identifier 16 is a RFID device, account identifier 16 may be embedded within or otherwise visually hidden within stored-value product 10.

Upon accessing the financial account or record, at 326, the account or record is accessed and value is added to the financial account or record. Thus, stored-value product 10 is activated and loaded. Once stored-value product 10 is activated and loaded, stored-value product 10 can be used by the consumer or any other bearer of stored-value product 10 to purchase goods and/or services at the retail store or other affiliated retail setting or website.

At 328, the retail store or other affiliated retail setting or website accepts stored-value product 10 as payment towards the purchase of goods and/or services made by the current bearer of stored-value product 10. In particular, the value currently loaded on stored-value product 10 is applied towards the purchase of goods and/or services. At 330, additional value is optionally loaded on stored-value product 10 at a point-of-sale terminal, kiosk, or other area of the retail store or related setting. Notably, in one embodiment, the entire stored-value product 10 does not necessarily need to be presented for use towards purchases and/or loading to stored-value product 10. Rather, at least account identifier 16 need be presented to perform operations 328 and 330. As such, in one embodiment, display portion 66 of carrier 14 is removed prior to performing steps 328 and 330 to decrease the size of item that is transported back and forth to and from the retail setting to access the associated account or record. In one embodiment, only car portion 64 of carrier 14 is presented for performing operations 328 and 330.

At 332, the retail setting or a website host affiliated with the retail setting supports a website for facilitating file downloads as directed by indicia 88 on stored-value product 10. For instance, a support website guides and allows a user to download a file associated with stored-value card by entering code 90 which is included on stored-value product 10. In one embodiment, the website associates different codes 90 with different file downloads and access to such file downloads is controlled by use of codes 90.

Upon accepting stored-value product 10 as payment at 328, the retail store or related setting can subsequently perform either operation 328 again, operation 330, and/or operation 332 as requested by a current bearer of stored-value product 10. Similarly, upon loading additional value to stored-value product 10 at 330 or supporting file download at 332, the retail store or related setting can subsequently perform any of operations 328, 330, and/or 332. In one example, the ability to accept stored-value product 10 as payment for goods and/or services is limited by whether the financial account or record associated with stored-value product 10 has any value at the time of attempted redemption.

Figure 8:
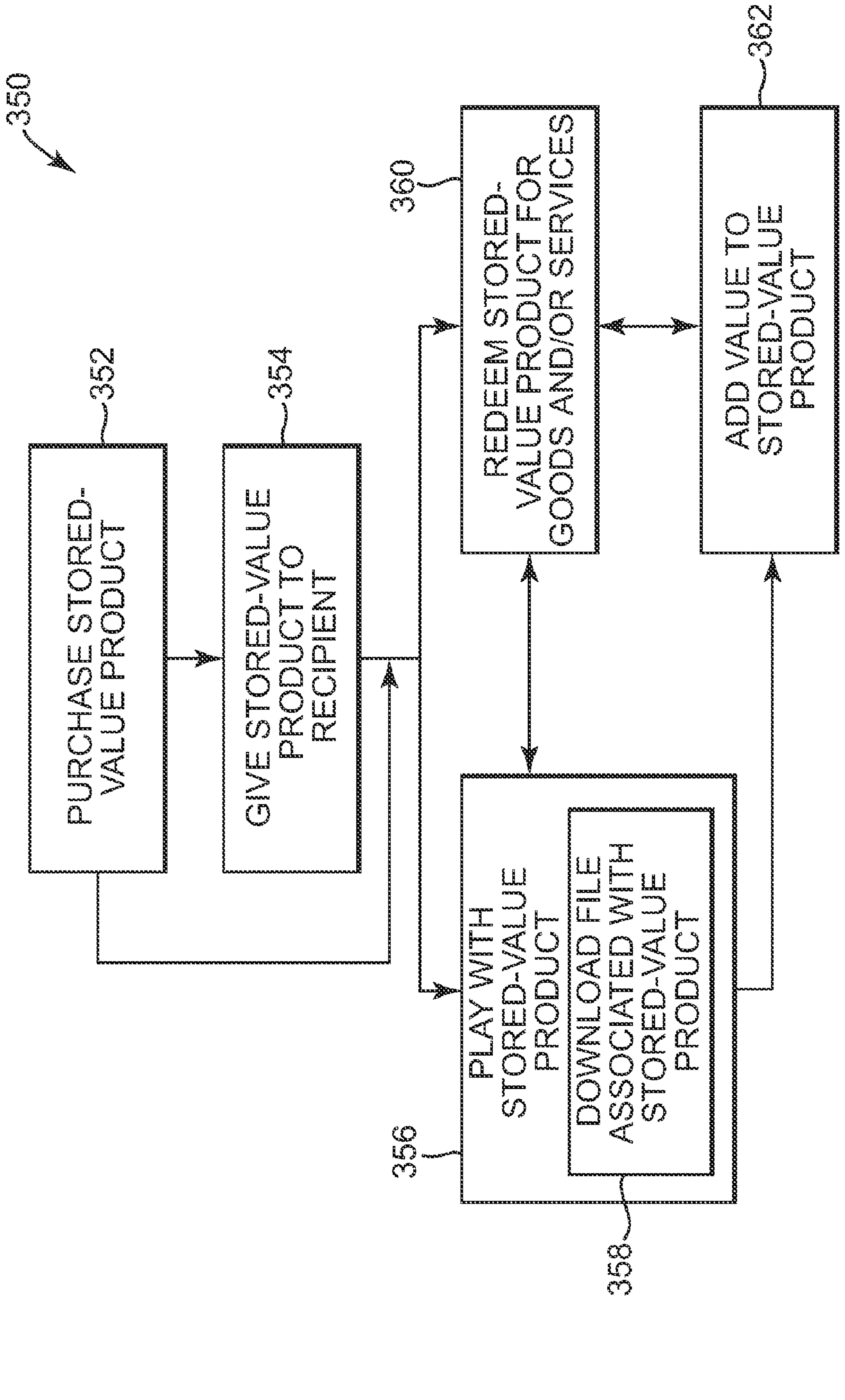
FIG. 8 is a flow chart illustrating one embodiment of a method of using a stored-value product, according to the present invention.

FIG. 8 is a flow chart illustrating one embodiment of a method 350 of using stored-value product 10. At 352, a potential consumer of stored-value product 10, which is displayed in a retail store or viewed on a website, decides to and does purchase stored-value product 10 from the retail store or website setting. Upon purchase of stored-value product 10, a retail store employee, retail store kiosk, or other person or device scans account identifier 16 to access the financial account or record linked to account identifier 16 and to thereby activate or load value onto stored-value product 10.

At 354, the consumer optionally gives stored-value product 10 to a recipient, such as a graduate, relative, friend, expectant parents, one having a recent or impending birthday, a couple having a recent or impending anniversary, etc. As an alternative, the consumer can keep stored-value product 10 for his or her own use.

At 356, the consumer or recipient, whoever is in current ownership or otherwise is the current bearer of stored-value product 10, plays with stored-value product 10. More specifically, car 12 of stored-value product can be played with in any suitable manner to amuse the bearer. In one embodiment, playing with stored-value product 10 at 356 includes downloading a file at 358. Downloading at 358 includes accessing a web site as indicated with indicia 88 on stored-value product 10 to download file(s) also as indicated on stored-value product 10. In one example, a music, video, and/or other file is downloaded using a specified website and code 90 as indicated by stored-value product 10. As such, in some instances, scratch release material 92 may be scratched away from carrier 14 to reveal code 90 to be used in the download at 358. In one embodiment, no file download is provided for or performed in connection with stored-value product 10.

At 360, the current bearer of stored-value product 10 redeems stored-value product 10 for goods and/or services from the retail store or website. At 362, the current bearer of stored-value product 10 optionally adds value to stored-value product 10, and more particularly, to the financial account or financial record associated with stored-value product 10, at the retail store or over the Internet. Upon playing with stored-value product 10 at 356, redeeming stored-value product 10 at 360, or adding value to stored-value product 10 at 362, the current bearer of stored-value product 10 subsequently can perform any of operations 356, 360, or 362 as desired. In one embodiment, the ability of the current bearer to repeat redeeming stored-value product 10 at 360 is limited by whether the financial account or record associated with stored-value product 10 has any value at the time of attempted redemption.

Although described above as occurring at single retail store or website, in one embodiment, purchasing stored-value product 10 at 352, redeeming stored-value product 10 at 360, and adding value to stored-value product 10 at 362, can each be performed at any one of a number of stores adapted to accept stored-value product 10 or over the Internet. In one example, the number of stores are each a part of a chain or similarly branded stores. In one example, the number of stores includes at least one website and/or at least one conventional brick and mortar store.

The stored-value product 10, like other stored-value cards, can be "re-charged" or "reloaded" at the direction of the original consumer, the gift recipient, or third party. The term "loading on" or "loaded on" herein should be interpreted to include adding to the balance of a financial account or record associated with a stored-value product. The balance associated with the stored-value product declines as the stored-value product is used toward purchase, encouraging repeat visits. The stored-value product remains in the user's purse or wallet, serving as an advertisement or reminder to revisit the associated merchant. Stored-value products, according to embodiments of the invention, provide a number of advantages to both the consumer and the merchant. In addition to having functionality similar to a gift card, other stored-value products according to embodiments of the invention function similar to loyalty cards, merchandise return cards, electronic gift certificates, employee cards, frequency cards, pre-paid cards, and other types of cards associated with or representing purchasing power or monetary value, for example.

Although the invention has been described with respect to particular embodiments, such embodiments are for illustrative purposes only and should not be considered to limit the invention. Various alternatives and changes will be apparent to those of ordinary skill in the art. Other modifications within the scope of the invention and its various embodiments will be apparent to those of skill in the art.

What is claimed is:

1. A stored-value product comprising:

a body shaped as a toy automobile;

wheels rotatably coupled to the body and extending below the body to contact a support surface in a manner supporting the body spaced from the support surface and allowing the stored-value product to roll across the support surface;

a bottom panel coupled to the body and defining a substantially planar exterior surface substantially facing away from the body; and an account identifier fixedly coupled to the substantially planar exterior surface of the bottom panel and exposed to be directly readable by a point-of-sale terminal, the account identifier linking the stored-value product to a financial account having an associated monetary value available for use toward at least one future purchase of one or more of good and services.

2. The stored-value product of claim 1, wherein the account identifier is a bar code.

3. The stored-value product of claim 1, wherein the account identifier is one of a magnetic strip and a radio frequency identification device.

4. The stored-value product of claim 1, in combination with a database remote from the stored-value product, wherein the database stores the financial account.

5. The stored-value product of claim 1, wherein the bottom panel and the body are formed as separate pieces of material.

6. The stored-value product of claim 5, wherein:

the bottom panel is a first portion of a carrier supporting the toy automobile, and the carrier includes a second portion extending from and beyond an outermost perimeter of the bottom panel, the second portion including an aperture to facilitate hanging the body, wheels, and the bottom panel from a supporting structure.

7. The stored-value product of claim 6, wherein the carrier includes a score line between the first portion and the second portion of the carrier to facilitate detachment of the first portion from the second portion.

8. The stored-value product of claim 1, wherein the body is formed of metal.

9. The stored-value product of claim 1, wherein the body is formed of injection molded plastic.

10. The stored-value product of claim 1, wherein the bottom panel includes cutouts to accommodate the wheels in a manner configured to avoid obstruction of rotation of the wheels.

11. The stored-value product of claim 1, further comprising an axle extending across the body, having opposing ends, and having one of the wheels coupled to each of the opposing ends, wherein the bottom panel extends below and substantially covers the axle.

12. The stored-value product of claim 11, wherein the axle is directly supported by and coupled to the body.

13. The stored-value product of claim 1, wherein the body includes indicia corresponding with a retailer configured to accept the monetary value of the financial account linked to the stored-value product as payment toward at least one future purchase of the one or more of good and services.

14. A financial transaction assembly comprising:

a first member including a bottom surface fixedly coupled to means for linking the financial transaction assembly to a financial account or record such that at least a portion of the financial transaction assembly functions to provide monetary payment toward a purchase of at least one of goods and services; and a manufactured toy automobile including:

a toy automobile housing coupled with the first member and defining a cavity having opening facing a bottom of the toy automobile housing, a plurality of rotatable articles each rotatable relative to the first member and the toy automobile housing, each of the plurality of rotatable articles extending below and coupled relative to the toy automobile housing to support the toy automobile housing spaced from a supporting plane, and at least one axle extending across the opening and having one of the plurality of rotatable articles coupled to each opposing end of the at least one axle;

wherein the bottom surface is positioned relative to the rotatable articles to extend substantially parallel to the supporting plane and to extend below and substantially cover the at least one axle.

15. The financial transaction assembly of claim 14, wherein:

the first member substantially covers the opening such that bottom surface faces away from the cavity.

16. The financial transaction assembly of claim 15, wherein:

the toy automobile housing defines a bottom edge, the bottom edge of the toy automobile housing extends below the bottom surface, and the rotatable articles extend below the bottom edge of the toy automobile housing.

17. The financial transaction assembly of claim 14, wherein the toy automobile is a toy car.

18. The financial transaction assembly of claim 14, wherein the toy automobile housing is formed from metal.

19. A financial transaction assembly comprising:

a bottom panel including a substantially planar exterior surface fixedly coupled to an account identifier linking the financial transaction assembly to a financial account or record having an associated monetary value available for use as monetary payment toward a purchase of at least one of goods and services; and a manufactured article including:

a body shaped as a toy automobile and coupled with the bottom panel, and a plurality of members each rotatable relative to the bottom panel and the body, each of the plurality of members extending below and coupled relative to the body to support the body spaced from a supporting plane in a manner allowing the financial transaction assembly to roll across the supporting plane;

wherein the substantially planar exterior surface is positioned relative to the plurality of members to extend substantially parallel to the supporting plane such that the account identifier is directly readable by a point-of-sale terminal and is surrounded by the plurality of members.

* * * * *

UNITED STATES PATENT AND TRADEMARK OFFICE

CERTIFICATE OF CORRECTION

PATENT NO. : 8,070,054 B2
APPLICATION NO. : 12/900877
DATED : December 6, 2011
INVENTOR(S) : Ted C. Halbur et al.

It is certified that error appears in the above-identified patent and that said Letters Patent is hereby corrected as shown below:

Column 10, line 10, in Claim 14, after "having" insert --an--.

Signed and Sealed this
Twentieth Day of March, 2012

David J. Kappos
*Director of the United States Patent and Trademark Office*